United States Patent [19]

Wagner et al.

[11] 4,211,572

[45] Jul. 8, 1980

[54] DRY-SET MORTARS AND METHOD FOR IMPROVING THE WATER RETENTIVITY THEREOF

[75] Inventors: Herman B. Wagner, Perkasie, Pa.; Jeffrey R. Ellis, Hightstown, N.J.

[73] Assignee: Tile Council of America, Inc., Princeton, N.J.

[21] Appl. No.: 897,148

[22] Filed: Apr. 17, 1978

[51] Int. Cl.$^2$ .................. C04B 7/35; C04B 7/352; C04B 7/353
[52] U.S. Cl. ........................... 106/90; 106/93; 106/98; 106/315
[58] Field of Search ............... 106/90, 93, 315, 98

[56] References Cited

U.S. PATENT DOCUMENTS

| | | | |
|---|---|---|---|
| 3,090,692 | 5/1963 | Kelly et al. | 106/315 |
| 3,243,307 | 3/1966 | Selden | 106/93 |
| 3,615,785 | 10/1971 | Moorer et al. | 106/315 |
| 3,824,107 | 7/1974 | Weiant | 106/93 |
| 4,089,696 | 5/1978 | Ray | 106/315 |

FOREIGN PATENT DOCUMENTS

| | | | |
|---|---|---|---|
| 1020525 | 2/1966 | United Kingdom | 106/93 |
| 1145239 | 3/1969 | United Kingdom | 106/93 |
| 1150710 | 4/1969 | United Kingdom | 106/93 |

*Primary Examiner*—James Poer
*Attorney, Agent, or Firm*—Morgan, Finnegan, Pine, Foley & Lee

[57] ABSTRACT

The water retentive properties of dry-set mortars containing water retentive agents such as cellulose ethers can be improved by the addition of small amounts of a promoter material such as ethylene glycol, diethylene glycol, propylene glycol, 1,3-propane diol, glycerol monoacetate and diacetate, ethyl glycolate and mono- and di-ethanol amines.

28 Claims, No Drawings

DRY-SET MORTARS AND METHOD FOR IMPROVING THE WATER RETENTIVITY THEREOF

BACKGROUND OF THE INVENTION

(1) Field of the Invention

The present invention relates to improved dry-set mortar compositions which contain an organic material which functions as a water retentivity promoter with the other components of the dry-set mortar to yield improved water retentivity not heretofore obtained.

(2) Description of the Prior Art

Dry-set mortars are recognized in the art as compositions distinguished from other hydraulic cement compositions. Conventional mortars generally contain a hydraulic cement, such as Portland cement, sand and water. The hydraulic cement component requires water in order to cure or harden. As a result, conventional mortars are not entirely self-curing because they tend to lose considerable amounts of water by evaporation into the surrounding air and also by absorption into the tile or masonry being set. Where the water loss is too great, the curing action is incomplete and the mortar becomes soft and chalky.

By increasing the proportion of water in the mortar to counteract the water loss, the mortar becomes too thin to work properly. A high water to mortar ratio also leads to cracking due to excessive shrinking of the mortar during curing. To insure sufficient water for hardening conventional mortars, wet conditions must be maintained on the substrate over which the mortar is placed and in the atmosphere surrounding the area during the period of curing. For example, where non-vitreous, absorbent tile are set, the loss of water is even greater, often requiring the non-vitreous tile to be soaked before being set.

Dry-set mortars are distinguished from conventional cementitious compositions because they additionally contain water retentive agents which tend to prevent the loss of substantial amounts of water from the mortar to the surroundings during the curing stages. As used herein, the term "dry-set mortar" is used in its broadest sense to include a mixture of a hydraulic cement such as Portland cement, with additives imparting water retentivity. Such cementitious compositions may be used as a coating, adhesive, mortar or grout adjacent such materials as plumb and true masonry, concrete, cut-cell expanded polystyrene, or rigid closed-cell, urethane insulation board, gypsum board, concrete glass fiber reenforced backer board, lean Portland cement mortar and more conventional wall and floor setting beds, brick, ceramic tile, marble and stucco. Dry-set mortars have been described, for example, in U.S. Pat. Nos. 2,820,713; 2,934,932; 2,990,382; 3,030,258; and 3,243,307.

The materials which have generally been added to dry-set mortars to improve water retentive properties have been high molecular weight materials which generally increase the viscosity of the liquid phase of the mortar mixture. It has been thought that water retentivity does correspond on a one to one basis with improvement in the viscosity of the liquid phase of the mortar mixture. Therefore, water retentive agents have generally fallen into the category of high molecular weight thickeners of the water-soluble type wherein they thicken or increase the viscosity of the aqueous phase of the dry-set mortar mixture.

In U.S. Pat. No. 3,030,258, a dry-set mortar is described having excellent water retentive properties when it contains a methyl cellulose of 10 to 7,000 cps. viscosity grade in two percent solution in quantities of 0.2 to 6.5% based on the dry weight of the composition. In U.S. Pat. No. 3,243,307, hydroxyethyl cellulose is taught as more effective than methyl cellulose because less hydroxyethyl cellulose is required to obtain the same water retentive properties. The greater effectiveness of the hydroxyethyl cellulose can be attributed to its higher viscosity, described in that patent as 400 to 30,000 cps. in two percent solution.

Although water retentivity still is associated with improved viscosity in the liquid phase of the dry-set mortar, the actual mechanism for improvement of water retentivity has not been completely explained.

In a copending application Ser. No. 709,176 in the name of Bernett, filed July 27, 1976, now U.S. Pat. No. 4,118,241, it is reported that partial replacement of high viscosity cellulose ethers with low viscosity, cold water soluble polyvinyl alcohols does not cause a reduction in water retentive properties. Therefore, this Bernett patent teaches the water retentivity is not solely a function of the viscosity of the water retentive agent added to the dry-set mortar.

It has now been discovered that the addition of certain organic materials, which in themselves offer no appreciable thickening properties, instead of diluting the liquid phase can improve the water retentive properties of a dry-set mortar. This discovery is quite significant in that the organic liquids which have been found to have these properties are considerably less expensive than the high molecular weight water retentive agents used in dry-set mortars. The addition of these organic liquids does not replace the need to have a higher molecular weight agent, such as a cellulose ether, present, but these organic liquids enable the amount of cellulose ether to be reduced. Hence, for a given amount of water retentive agent, higher water retentive properties can be obtained by the use of the promoters, described herein. Therefore, the promoters make it possible to more efficiently use water retentive agents, particularly those of high viscosity.

In our copending application entitled "Improved Thickeners and Methods for Improving the Effectiveness of Particulate Thickeners of the Soluble Type", filed contemporaneously with the instant application, it is taught that certain organic materials, when added to certain thickeners, such as cellulose ethers, improve the overall thickening properties of the thickeners. That application is incorporated herein by reference. In accordance with the process in that application, the thickener must be pretreated with the organic material and allowed to partially swell prior to its use as a thickener in a liquid composition.

It has been found in accordance with the present invention that improved water retentive properties are obtained in dry-set mortars by using a water retentive agent pretreated with a suitable promoter or by adding the promoter directly to the mortar containing water retentive agent without any pretreatment. Therefore, the promoter of the present invention can be added in situ with the thickener and other components of the dry-set mortar and water. The improved thickening properties as set forth in said copending application do not completely explain the rather surprising results obtained in dry-set mortars, as set forth herein.

A number of prior art references have described the use of certain organic liquids in hydraulic cement compositions, but those compositions are not dry-set mortars and therefore do not contain water retentive agents. For example, in U.S. Pat. No. 3,239,479, triethylene glycol is used as a humectant in a conventional cement composition. In U.S. Pat. No. 3,090,692, triethanol amine is used in making concrete blocks.

SUMMARY OF THE INVENTION

The present invention relates to an aqueous dry-set mortar composition, said composition comprising (a) a dry composition comprising the following components in amounts by weight based upon the dry composition: a hydraulic cement, 0 to 90% of an inert filler, 0.05 to 3.0% of a water-soluble cellulose ether having a viscosity of 1,500 cps to 100,000 cps and preferably between 25,000 and 80,000 cps in 2% solution, but viscosities outside these ranges are suitable in certain applications, measured at 25° C., and a water retentivity promoter which is an organic material, preferably liquid. Examples of such promoters include ethylene glycol, diethylene glycol, propylene glycol, 1,3-propane diol, gylcerol monoacetate and diacetate, ethyl glycolate and mono- and di-ethanol amines; and (b) water.

The present invention also relates to methods of preparing dry-set mortar compositions having improved water retentivity properties wherein the promoter as described above may be added to any of the dry components of the dry-set mortar individually or added directly, in situ, to the mixed dry-set mortar.

In describing the hydraulic cement component in accordance with this invention, Portland cement will be referred to hereinafter as an illustrative example to simplify the description of the invention. It should be realized, however, that the principles of this invention are applicable to other hydraulic cements including, for example, blast-furnace slag cement and pozzolan cement.

The presence of sand or other inert filler is generally preferred in the formulation of a dry-set mortar composition having the performance properties required in the industry for setting tile. When included, inert fillers should be present in amounts of 40 to 90% based on the weight of the dry composition. Such fillers may have a coarse or fine grain size depending upon the required use and properties for the mortar and the amounts of the fillers present. Ranges for the inert filler component as well as ranges for its grain size are described, for example, in copending application Ser. No. 709,176 by Bernett, which is incorporated herein by reference.

The water retentive agents useful in the dry-set mortars of the present invention include those previously known for use in dry-set mortars. Some of these include cellulose ethers such as methyl cellulose, ethyl cellulose, carboxymethyl cellulose, hydroxypropyl methyl cellulose, hydroxypropyl cellulose and hydroxyethyl cellulose. A specific example of a methyl cellulose includes the material under the trade name "Methocel" available from Dow Chemical Company. Other specific water retentive agents include: hydroxyethyl cellulose available under the trade name "Cellosize" from Union Carbide Corporation; "Tylose" from American Hoechst; "Klucel" from Hercules Corporation; and benzyl hydroxyethyl or phenyl hydroxyethyl cellulose ethers from Hercules Chemical Co.

These high molecular weight water retentive agents are normally present in the range of 0.2 to 6% by weight of the dry components. The actual amount of the water retentive agent will vary depending upon its viscosity. In a dry-set mortar containing the water retentive promoter of the present invention, the amount of water retentive agent can be reduced to within the range of 0.05 to 3.0% by weight and preferably to 0.05 to 1.0% by weight. These reduced ranges are merely illustrative of the benefits obtained by using the promoter and larger amounts of water retentive agent can be used in accordance with the present invention.

Agents having a viscosity in the lower end of this viscosity range must be present in larger amounts. Therefore, a water retentive agent such as Tylose MHB 30,000 p, a methyl hydroxyethyl cellulose from American Hoechst, which has a viscosity in 2% solution of 30,000 cps, should be present in amounts greater than 0.3% b.w. of the dry composition and preferably in the order of 0.4% or more.

The water retentivity promoter is an organic material which does not have any appreciable thickening properties for aqueous solutions. However, when used in accordance with the present invention, the promoter yields unexpected and synergistic properties. The material has at least one polar functional group capable of associating with water, such as an amino or hydroxy group. The promoter is preferably in liquid form at temperatures ranging from 20° C. to 120° C., but also may be in vapor and solid form.

Examples of such promoters are ethylene glycol, diethylene glycol, propylene glycol, 1,3-propane diol, glycerol monoacetate and diacetate, ethyl glycolate, and mono- and di-ethanol amines. Such promoters should be present in the weight ratio range of water retentive agent to promoter of from 20:1 to 1:2 and preferably 10:1 to 1:2.

The promoter may be added to any of the dry components of the dry-set mortar individually or to the dry-set mortar as mixed, with improved retentivity properties obtained.

It is preferred in accordance with the present invention that dry-set mortars containing a water retentivity promoter achieve an index of water retentivity in the order of 40 to 70.

The dry components of the dry-set mortar when added to water form a thin bed mortar or bonding material. Water should be added in sufficient amounts to give the mortar good workable consistency. Generally, the amount of water needed in the mixed mortar composition will depend upon the relative proportions of the other ingredients. For example, as the sand content of the mortar increases, the weight ratio of water to total dry mix decreases. In general, from about 15 to 40% water by weight of the dry composition should be used to obtain good consistency and flowability characteristics for the mortar.

Other materials conventionally used in dry-set mortars may be included in the dry-set mortars of the present invention. Such additives include pigments, perfumes, anti-sagging agents, anti-foam agents and materials which generally modify the open time and set time of dry-set mortars. These and other additives are well known in the art and are described in greater detail in the prior art patents cited hereinabove.

The conventional methods for setting tile with dry-set mortars may be employed in utilizing the compositions of the present invention. Preferably, these mortars are used to form thin beds having a thickness of about 1/32 inch to about ¼ inch. The dry-set mortars of this invention may be used over a variety of surfaces and backings.

In the examples below, water retentivity is measured according to the test described in American Society Ceramic Bulletin, February 1978, p. 235, which is incorporated herein by reference. This measurement determines an Index of Retentivity. Higher index values represent increased water retentivity.

EXAMPLE 1

In this example, the effectiveness of adding the water retentivity promoters is illustrated. Dry-set mortars of the same composition, except for the presence or absence of the promoters, are compared for water retentivity. The water retentive agents chosen for this example are methyl cellulose powders commercially available from the Dow Chemical Company under the trade name "Methocel". These water retentive agents vary in their viscosity in aqueous 2% solutions as follows:

Powder A: 4,000 cps Methocel. K4M
Powder B: 50,000 cps Methocel. 90 HG DGS
Powder C: 75,000 cps Methocel. Dow 856

Six dry-set mortars were prepared having the compositions described in the table below. For Mortars 2, 4 and 6, a portion of the specified methyl cellulose powder is intimately contacted with ethylene glycol prior to being mixed with the other components of the dry-set mortar. This contacting step comprises agitating the mix at a temperature of 100° C. for a period of 60 minutes. Ethylene glycol is a solvent for methyl cellulose only at temperatures of about 158° C. and above.

The water retentive agents remained in a solid particulate form and the ethylene glycol disappeared within or was absorbed by the thickener particles.

Each of the promoted and unpromoted water retentive agents, all in dry particle form, were then combined with the other dry components for each mortar, according to the following table in parts by weight.

|  | 1 | 2 | 3 | 4 | 5 | 6 |
|---|---|---|---|---|---|---|
| Portland Cement | 48.15 | 48.15 | 48.15 | 48.15 | 48.15 | 48.15 |
| Alum | 1.25 | 1.25 | 1.25 | 1.25 | 1.25 | 1.25 |
| "D" Sand | 50.00 | 50.00 | 50.00 | 50.00 | 50.00 | 50.00 |
| Ethylene Glycol | — | 0.3 | — | 0.15 | — | 0.30 |
| Methyl Cellulose A | 0.6 | 0.6 | — | — | — | — |
| Methyl Cellulose B | — | — | 0.3 | 0.3 | — | — |
| Methyl Cellulose C | — | — | — | — | 0.3 | 0.30 |

The aqueous dry-set mortars were then formed from each dry mix by adding to each 24 parts by weight of water per 100 parts by weight of the dry mix while agitating the mixture. The promoted water retentive agents in Mortars 2, 4 and 6 blended more smoothly with no noticeable lumping than the unpromoted retentive agents in Mortars 1, 3 and 5.

Each aqueous mortar was then tested for water retentivity properties in accordance with the test for Index of Water Retentivity of Mortars described in the article entitled "Index of Water Retentivity" by Herman B. Wagner appearing in Vol. 57, No. 2, page 235 of the February 1978 issue of American Ceramic Society Bulletin. The Index of Water Retentivity for each of the mortars is set forth below:

| Mortar | Index Of Water Retentivity |
|---|---|
| 1 | 54.5 |
| 2 (Promoted) | 67.0 |
| 3 | None |
| 4 (Promoted) | 44.6 |
| 5 | 24.7 |
| 6 (Promoted) | 45.0 |

EXAMPLE 2

This example illustrates that the retentivity promoter can be incorporated into the dry-set mortar system in three different ways yielding comparable index of water retentivity values.

Two additional mortars, 7 and 8, are prepared having the same composition as Mortar 6 of Example 1. However, Mortars 7 and 8 are prepared differently with respect to the addition of the water retentive promoter.

Mortar 7 is prepared as follows:

The ethylene glycol is added to an already formed mixture of the dry components and water retentive agent. This mixture is then added to water.

Mortar 8 is prepared as follows:

The water retentive agent and dry components are added to an aqueous solution containing 1.2% ethylene glycol.

Mortars 6, 7 and 8 were tested for water retentivity in accordance with the test described in Example 1 and all three mortars were found to have an index of water retentivity of 45.0±0.5.

EXAMPLE 3

Ethylene glycol has been found to decrease the set time of dry-set mortars when used in small amounts. As a result, when ethylene glycol is used in small amounts, a set retarding agent such as glycerine should be incorporated in the composition. The following formulations are illustrative:

| Portland Cement | 48.15 | Portland Cement | 48.075 |
|---|---|---|---|
| Sand | 50.00 | Sand | 50.00 |
| Aluminum Sulfate | 1.25 | Aluminum Sulfate | 1.25 |
| Methyl Cellulose Dow 856 | 0.30 | Tylose MHB 30,000 | 0.45 |
| Ethylene Glycol | 0.24 | Ethylene Glycol | 0.18 |
| Glycerine | 0.06 | Glycerine | 0.045 |

What is claimed is:

1. A dry composition capable of being mixed with water to form a dry-set mortar, said dry composition comprising, in percentages by weight of the dry composition a hydraulic cement,
   0 to 90 percent of an inert filler,
   0.05 to 3.0 percent of a water retentive agent having a viscosity of 1,500 cps to 100,000 cps in 2 percent solution, and
   a water retentivity promoter which is an organic material having at least one polar functional group capable of associating with water, which material alone does not have appreciable thickening properties for water, but which is capable of increasing the Index of Water Retentivity of the composition when mixed with water,
   wherein the weight ratio of water retentive agent to promoter is in the range 20:1 to 1:2.

2. The composition of claim 1 wherein said water retentivity promoter is a liquid at temperatures in the range 20° to 100° C. and which functional groups are selected from hydroxy and amino groups.

3. The composition of claim 1 wherein said promoter is selected from the group consisting of ethylene glycol, diethylene glycol, propylene glycol, 1,3-propane diol, glycerol monoacetate and diacetate, ethyl glycolate and mono- and di-ethanol amines.

4. The dry composition of claim 1 wherein said hydraulic cement is Portland cement.

5. The dry composition of claim 1 wherein said water retentive agent is a cellulose ether.

6. The dry composition of claim 5 wherein said cellulose ether is selected form the group consisting of methyl cellulose, ethyl cellulose, hydroxypropyl methyl cellulose, hydroxyethyl cellulose and hydroxypropyl cellulose, and mixtures thereof.

7. The dry composition of claim 1 wherein the cellulose ether component has a viscosity in 2 percent aqueous solution of between 25,000 and 80,000 cps and is present in the range from 0.2 to 0.8 percent by weight of the dry composition.

8. The dry composition of claim 7 wherein the weight ratio of water retentive agent to promoter is in the range 10:1 to 1:1.

9. An aqueous dry-set mortar composition with improved water retentivity, said composition comprising
(A) a dry composition which comprises the following in weight percentages based on the dry composition:
a hydraulic cement,
0 to 90 percent of an inert filler,
0.05 to 3.0 percent of a water soluble cellulose ether having a viscosity of 15,000 cps to 150,000 cps in 2 percent solution, and
a water retentivity promoter which is an organic material having at least one polar functional group capable of associating with water, which material alone does not have appreciable thickening properties for water; and
(B) water,
wherein the water retentivity promoter increases the water retentivity of the mortar and the weight ratio of water retentive agent to promoter is in the range 20:1 to 1:2.

10. The composition of claim 9 wherein said water retentivity promoter is a liquid at temperatures in the range 20° to 100° C. and which functional groups are selected from hydroxy and amino groups.

11. The aqueous dry-set mortar composition of claim 9 wherein the cellulose ether is selected from the group consisting of methyl cellulose, ethyl cellulose, hydroxypropyl methyl cellulose, hydroxyethyl cellulose and hydroxypropyl cellulose, benzyl hydroxyethyl cellulose and phenyl hydroxyethyl cellulose, and mixtures thereof.

12. The aqueous dry-set mortar of claim 11 wherein said cellulose ether has a viscosity in 2 percent aqueous solution in the range of about 25,000 to 80,000 cps.

13. The composition of claim 12 wherein said cellulose ether is present in the range 0.05 to 1.0 percent by weight of the dry composition.

14. The aqueous dry-set mortar of claim 11 wherein the promoter is selected from the group consisting of ethylene glycol, diethylene glycol, propylene glycol, 1,3-propane diol, glycerol monoacetate and diacetate, ethyl glycolate and mono- and di-ethanol amines.

15. The dry-set mortar of claim 9 wherein the water retentive agent is a methyl cellulose and the promoter is ethylene glycol.

16. The dry-set mortar of claim 15 wherein the weight ratio of water retentive agent to promoter is in the range 10:1 to 1:2.

17. The aqueous mortar composition of claim 9 wherein water is present in the amount from 15 to 40 percent by weight of the dry composition.

18. The aqueous mortar composition of claim 9 wherein said inert filler is present in the range of 40 to 90% by weight.

19. The aqueous mortar composition of claim 9 additionally containing an antifoam agent.

20. The aqueous mortar composition of claim 9 additionally containing glycerine.

21. A method for preparing the aqueous dry-set mortar composition of claim 9, said method comprising the steps of
contacting said water retentive agent with said promoter at a temperature between 20° C. and 100° C. under agitation until the promoter is absorbed by the water retentive agent,
mixing the promoted water retentive agent with the other dry components of said dry-set mortar composition, and
adding sufficient water to form the aqueous dry-set mortar.

22. A method for preparing the dry-set mortar composition of claim 9 wherein a mixture is formed of the dry components of the dry-set mortar and that mixture is combined with water containing the promoter.

23. A method for preparing the dry-set mortar composition of claim 9 wherein the promoter is blended with the dry components and that mixture is subsequently added to water.

24. A dry concentrate for use in preparing a dry-set mortar when added to a hydraulic cement and water, said concentrate comprising
an inert filler,
0.05 to 3.0 percent of a water retentive agent having a viscosity of 1,500 cps to 100,000 cps in 2 percent solution, and
a water retentivity promoter which is an organic material having at least one polar functional group capable of associating with water, which material alone does not have appreciable thickening properties for water, but which is capable of increasing the Index of Water Retentivity of the composition when mixed with water, wherein the weight ratio of water retentive agent to promoter is in the range 20:1 to 1:2.

25. A method of installing ceramic tile, said method comprising the steps of
(i) preparing an aqueous dry-set mortar comprising:
a hydraulic cement,
0 to 90 percent of an inert filler,
0.05 to 3.0 percent of a water retentive agent having a viscosity of 15,000 cps to 150,000 cps in 2 percent solution, and
a water retentivity promoter which is an organic material having at least one polar functional group capable of associating with water, which material alone does not have appreciable thickening properties for water, but which is capable of increasing the Index of Water Retentivity of the composition when mixed with water, (ii) covering a substrate with a thin bed of said mortar, and
(iii) pressing dry tile into the resulting bed.

26. The dry composition of claim 7 wherein the weight ratio of water retentive agent to promoter is in the range 10:1 to 1:1.

27. The dry-set mortar of claim 15 wherein the weight ratio of water retentive agent to promoter is in the range 10:1 to 1:1.

28. The method of claim 25 wherein the bed of mortar has a thickness of from 1/32 inch to ¼ inch.

* * * * *